(12) United States Patent
Jiang et al.

(10) Patent No.: US 8,498,332 B2
(45) Date of Patent: Jul. 30, 2013

(54) CHROMA SUPRESSION FEATURES

(75) Inventors: Xiaoyun Jiang, San Diego, CA (US);
Shuxue Quan, San Diego, CA (US);
Chinchuan Andrew Chiu, San Diego, CA (US); Szepo Robert Hung, Carlsbad, CA (US); Ruben M. Velarde, Chula Vista, CA (US); Ying Xie Noyes, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1657 days.

(21) Appl. No.: 11/533,916

(22) Filed: Sep. 21, 2006

(65) Prior Publication Data
US 2008/0075174 A1    Mar. 27, 2008

(51) Int. Cl.
*H04N 11/02*    (2006.01)

(52) U.S. Cl.
USPC ................. 375/240.01; 375/240.26

(58) Field of Classification Search
USPC ....................... 375/240.21–240.26
See application file for complete search history.

(56) References Cited

U.S. PATENT DOCUMENTS

| | | | | |
|---|---|---|---|---|
| 4,136,957 A * | 1/1979 | Uno et al. | ...................... | 356/394 |
| 4,270,223 A * | 5/1981 | Marston | ........................ | 455/305 |
| 4,975,768 A * | 12/1990 | Takaraga | ....................... | 358/538 |
| 5,446,504 A * | 8/1995 | Wada | ........................... | 348/645 |
| 5,563,666 A * | 10/1996 | Suzuki | .......................... | 348/645 |
| 6,101,272 A * | 8/2000 | Noguchi | ....................... | 382/167 |
| 6,618,502 B1 * | 9/2003 | Okada et al. | .................. | 382/167 |
| 6,961,085 B2 * | 11/2005 | Sasaki | ......................... | 348/222.1 |
| 6,972,793 B1 * | 12/2005 | Kameyama | .................... | 348/256 |
| 7,317,827 B2 * | 1/2008 | Munsil | .......................... | 382/162 |
| 2003/0035069 A1 * | 2/2003 | Fukui et al. | .................... | 348/679 |
| 2007/0091213 A1 * | 4/2007 | Jaspers | .......................... | 348/687 |

FOREIGN PATENT DOCUMENTS

| | | |
|---|---|---|
| DE | 3629469 | 3/1988 |
| EP | 0145801 | 6/1985 |
| EP | 0470579 | 2/1992 |
| EP | 0647069 | 4/1995 |
| EP | 0933952 | 8/1999 |
| JP | 5-50286 A | 3/1993 |
| JP | 2001-156207 A | 6/2001 |
| WO | 9105442 | 4/1991 |

OTHER PUBLICATIONS

International Search Report—PCT/US2007/079085, International Search Authority—European Patent Office—Mar. 27, 2008.
Written Opinion—PCT/US2007/079085, International Search Authority—European Patent Office—Mar. 27, 2008.

* cited by examiner

*Primary Examiner* — David Czekaj
*Assistant Examiner* — Leron Beck
(74) *Attorney, Agent, or Firm* — Timothy Loomis; James R. Gambale, Jr.

(57) ABSTRACT

Apparatus are provided including an image signal carrier, a luminance information evaluator, and a chrominance information modifier. The image signal carrier is encoded with an image signal including luminance information and chrominance information. The luminance information evaluator evaluates the luminance information in the image signal for a given region within the image to identify when the given region is one of substantially white and substantially dark. The chrominance information modifier is provided to modify the chrominance information corresponding to the given region when the given region is one of substantially white and substantially dark.

33 Claims, 5 Drawing Sheets

CHROMA SUPRESSION FEATURES

COPYRIGHT NOTICE

This patent document contains information subject to copyright protection. The copyright owner has no objection to the facsimile reproduction by anyone of the patent document or the patent, as it appears in the US Patent and Trademark Office files or records, but otherwise reserves all copyright rights whatsoever.

BACKGROUND

Aspects of the disclosure may relate to devices for capturing, storing, playing back, and/or displaying images.

Image and video capture, storage, playback, and display capabilities are being incorporated into a wide range of devices, including, e.g., wireless communications devices (e.g., mobile phones), portable digital assistants (PDAs), laptop computers, and desktop computers. In these devices, images, when viewed, played back, or printed, may include unnatural artifacts such as inconsistencies in dark areas of the image and tinting in areas that are suppose to be white.

SUMMARY OF THE DISCLOSURE

Apparatus are provided, including an image signal carrier, a luminance information evaluator, and a chrominance information modifier. The image signal carrier is encoded with an image signal including luminance information. The luminance information evaluator evaluates the luminance information in the image signal in a given region within the image to identify when the given region is one of substantially white and substantially dark. The chrominance information modifier modifies the chrominance information corresponding to the given region when the given region is one of substantially white and substantially dark.

BRIEF DESCRIPTION OF THE DRAWINGS

The subject matter disclosed herein is further described in the detailed description, which follows, by reference to the noted drawings by way of non-limiting example embodiments, in which like reference numerals represent similar parts throughout the several views of the drawings, and wherein.

DETAILED DESCRIPTION

Figure 1:
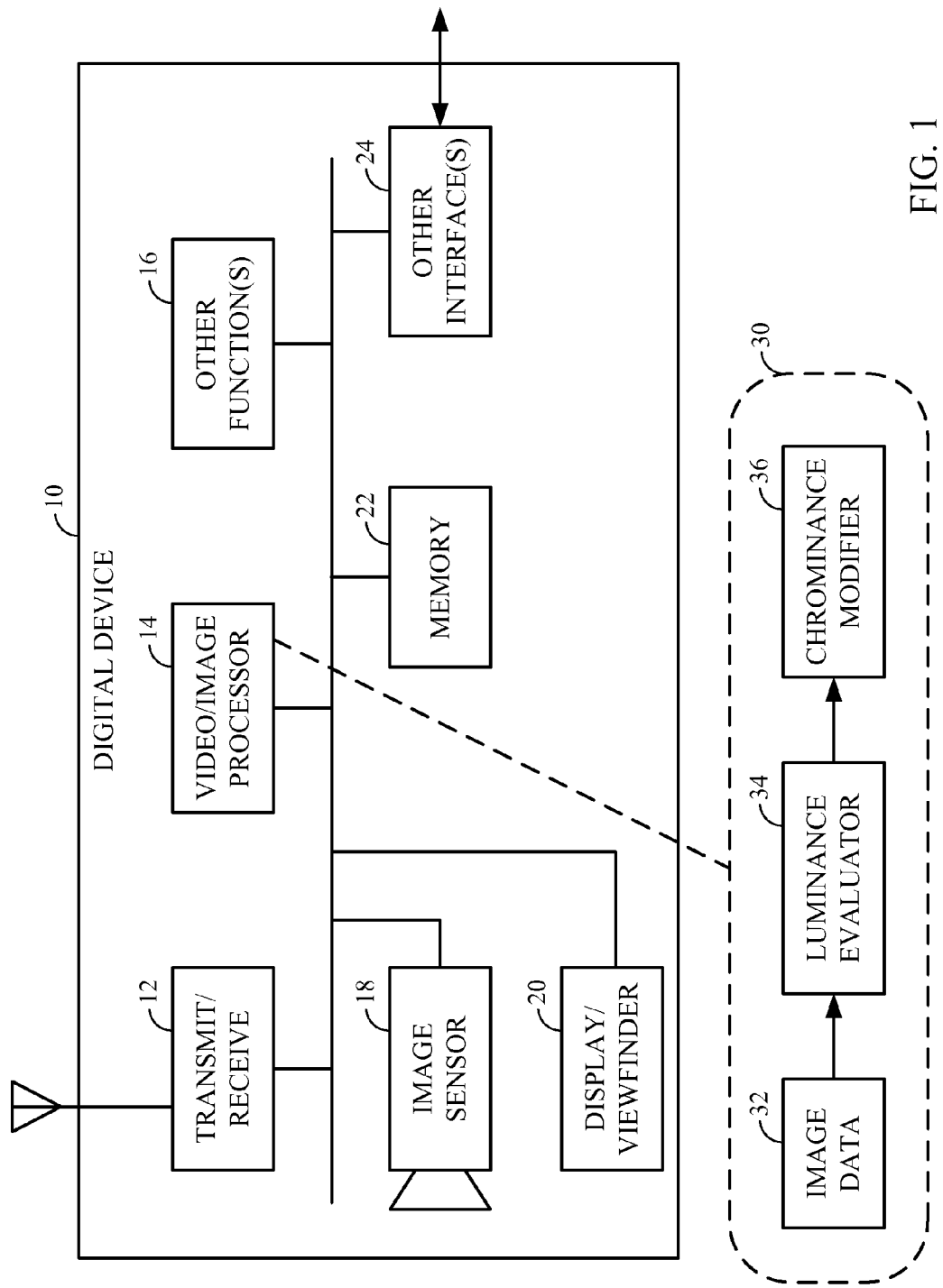
FIG. 1 is a block diagram of a digital device in accordance with one embodiment of the present disclosure.

Referring now to the drawings in greater detail, FIG. 1 is a block diagram of a digital device in accordance with one embodiment of the present disclosure. The illustrated digital device 10 may, for example, be a digital television, a digital direct broadcast system, a camera, a camcorder, a wireless communications device (e.g., mobile phone), a portable digital assistant (PDA), a laptop computer, a desktop computer, or another digital device that involves or includes functionality for image and/or video capture, storage, playback, and/or display. The illustrated digital device 10, therefore, may or may not include a transmit/receive mechanism 12, an image sensor 18, a display/view finder 20, and another interface or interfaces 24. The illustrated digital device 10 further includes a video or image processing component 14 and a memory 22. In addition, other function elements 16 may be provided. In the illustrated embodiment of digital device 10, video and/or image processor 14 includes a darkness and white processing portion 30. The illustrated processing portion 30 may include a portion of a video or image processing pipeline within video/image processor 14.

The illustrated processing component 30 includes an image signal carrier 32 encoded with or otherwise carrying image data, a luminance information evaluator 34, and a chrominance modifier 36. The image signal carrier 32 may, for example, be a serial or parallel interface for carrying an image signal, a frame buffer, another memory mechanism, or any type of structure for carrying or holding, or otherwise encoding machine-readable media to represent, the image signal to be processed. The illustrated processing component 30 may be operational as part of an image capture function, for example, when an image is captured by image sensor 18. It may be also operational as part of a processing component of a digital device which takes existing images or video previously recorded and processes such images or video in order to improve the quality of the same. In addition, or alternatively, processing component 30 may be operational when displaying or otherwise playing back images or video stored, for example, in memory 22 of digital device 10. The processing component 30 processes the image or video frame to improve white and dark portions of the image. Specifically, unnatural artifacts, such as inconsistencies in dark areas of the image and tinting in areas that are suppose to white, are removed or otherwise mitigated.

The image signal, regardless of whether the image is a still image or an image within a video signal, may be in one of several different formats, including Lab, RGB, YUV, YCbCr, YIQ, CMY, CMYK, or another type of data for representing image information.

The image signal includes luminance information as well as chrominance information. The luminance information, in the case of Lab data, may be the L parameter. In the case of RGB data, it may be the weighted sum of the linear RGB components, and in the case of R'G'B' data, it may be the weighted sum of the non linear R'G'B' components. In the event the data is CMY data or CMYK data, the luminance information may be K and/or the weighted sum of the CMY components. When YUV data is used, the luminance information may be the Y portion of that data. When YCbCr is used, the luminance information may be the Y component. When YIQ data is used, the luminance information may be the Y component. The chrominance information generally includes or is based on a and b of the Lab, RG, and B when RGB data is used, and CM and Y when CMY data is used. The chrominance information may also include or be based on U and V when YUV data is used, Cb and Cr if YCbCr data, and IQ of YIQ data.

The terms luminance and chrominance, as used for one or more embodiments herein, may refer to darkness, i.e., as related to the luminous-efficiency function of human eyes (for luminance) and color (e.g., including both hue and saturation components) (for chrominance).

The illustrated luminance evaluator 34 is provided to evaluate the luminance information in the image signal for a given region within the image (for example, for a given pixel within an image) to identify when the given region is one of substantially white and substantially dark. This may be determined, depending on the scheme used to represent the luminance (e.g., if it is the Y value in a YCbCr signal) by evaluating when the luminance value is less than a lower threshold value, meaning that the given region is substantially dark, or when the luminance value is greater than a higher threshold value, meaning that the given region is substantially white.

The image may be a two dimensional (2-D) image, in the form of a three-dimensional (3-D) model, or in the form of a two-dimensional frame which serves as a two dimensional representation of a three dimensional image, for example, as is the case in animated graphics based upon a 3-D model. The image data may be in the form of image data pixels representing respective different areas or regions within the image. Accordingly, a given image may include a pattern (e.g., an array) of pixels. Each pixel may correspond to a defined location within the image (for example, a grid cell) and comprise tone information. Tone information for a given point (e.g., corresponding to a pixel) or region of an image generally comprises a color component and an intensity component.

The illustrated chrominance modifier 36 is provided to modify the chrominance information corresponding to the given region, when the given region is one of substantially white and substantially dark. The modifier may multiply a suppression ratio times individual values making up the chrominance information, for example, using one or more lookup tables.

Figure 2:
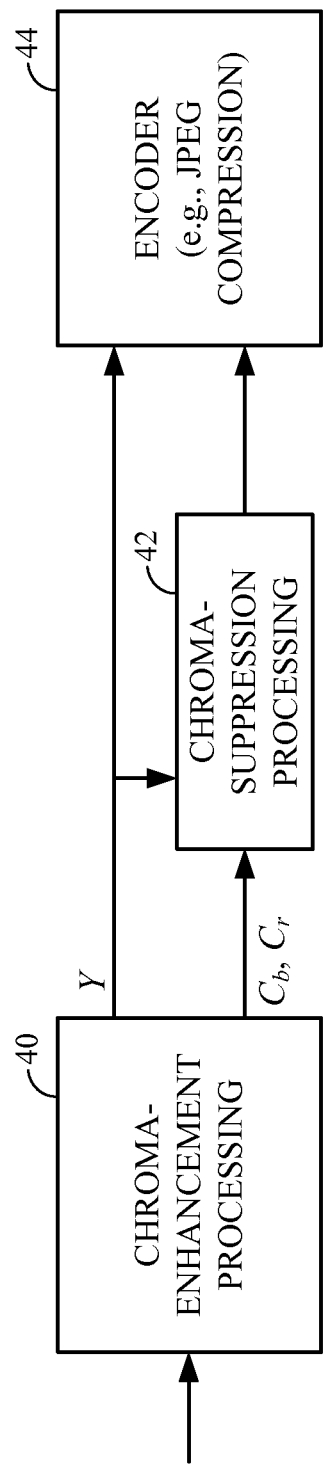
FIG. 2 is a schematic diagram of a portion of an image processing pipeline.

FIG. 2 is a schematic diagram of a portion of an image processing pipeline. The circuitry illustrated in FIG. 2 includes a chroma enhancement processing mechanism 40, a chroma suppression processing mechanism 42, and an encoder 44. The chroma enhancement processing mechanism 40, may, for example, perform a transformation from a RGB signal to a YCbCr signal, to facilitate color reproduction and color adjustment, and accordingly, output Y data, in this embodiment representing luminance, and Cb and Cr data, in this embodiment representing chrominance.

Chroma suppression processing mechanism 42 receives Y and Cb, Cr data as inputs thereto, and outputs modified chrominance information. Encoder 44 encodes the video data, including the luminance information (Y) and the chrominance information Cb, Cr (as modified by chroma suppression processing mechanism 42). By way of example, encoder 44 includes a JPEG compression mechanism.

Figure 3:
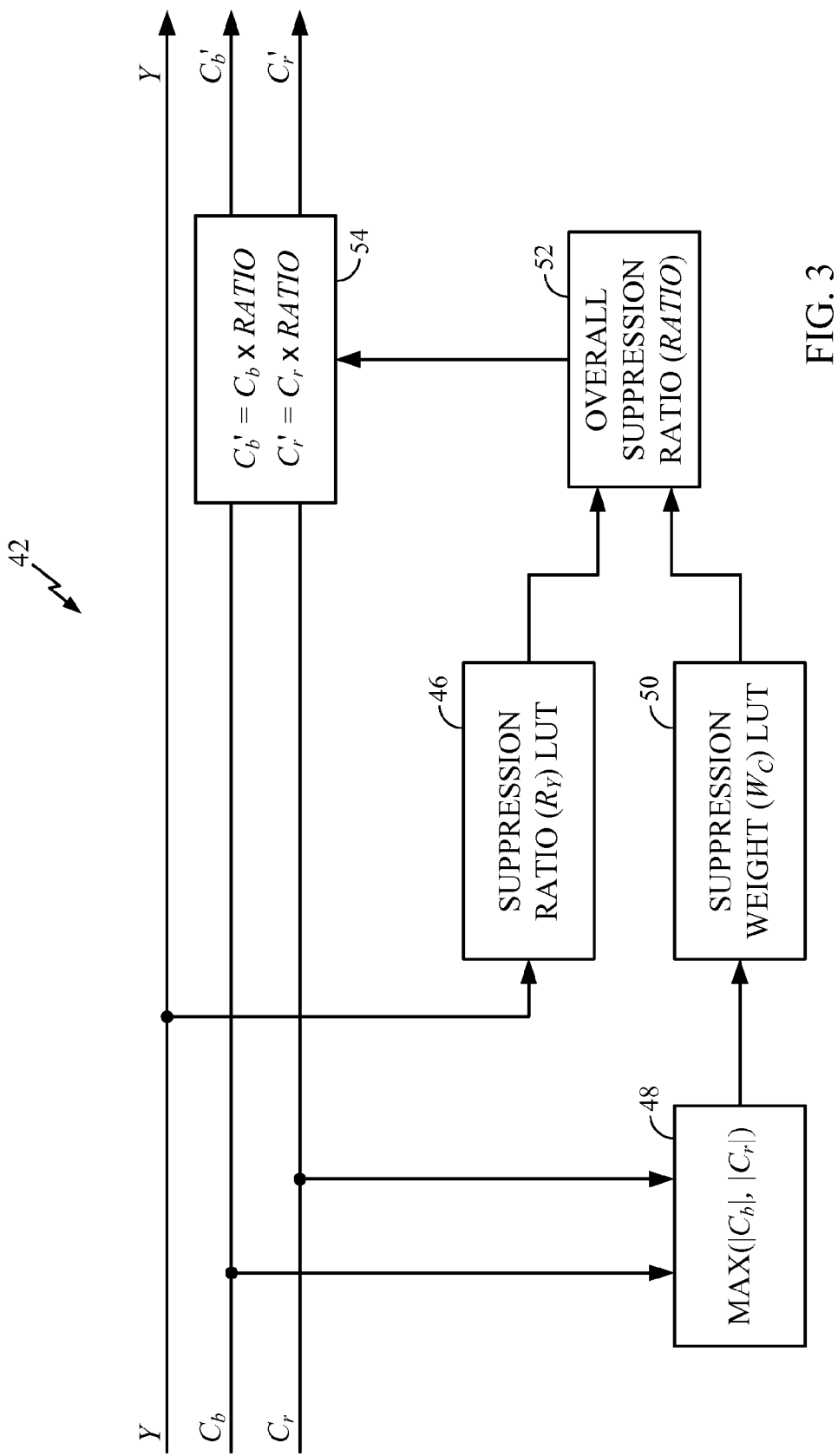
FIG. 3 is a more detailed schematic diagram of the chroma suppression processing mechanism shown in FIG. 2.

FIG. 3 shows a more detailed schematic diagram of one example implementation of the chroma suppression processing mechanism 42 shown in FIG. 2. The illustrated circuitry 42 shown in FIG. 3 includes a suppression ratio mechanism 46, a max chrominance magnitude mechanism 48, a suppression weight mechanism 50, and an overall suppression ratio calculator 52. Overall suppression ratio calculator 52 determines an overall suppression ratio value by which each of Cb and Cr will be multiplied in order to produce modified chrominance values Cb' and Cr'. A multiplier 54 is provided in the circuit to effect the multiplication by this overall suppression ratio value.

An initial suppression ratio $R_Y$ is calculated by suppression ratio mechanism 46. Suppression ratio mechanism 46 may, for example, include a lookup table (LUT) populated based upon the graph representing the suppression ratio in relation to luminance Y as shown in FIG. 4.

Figure 5:
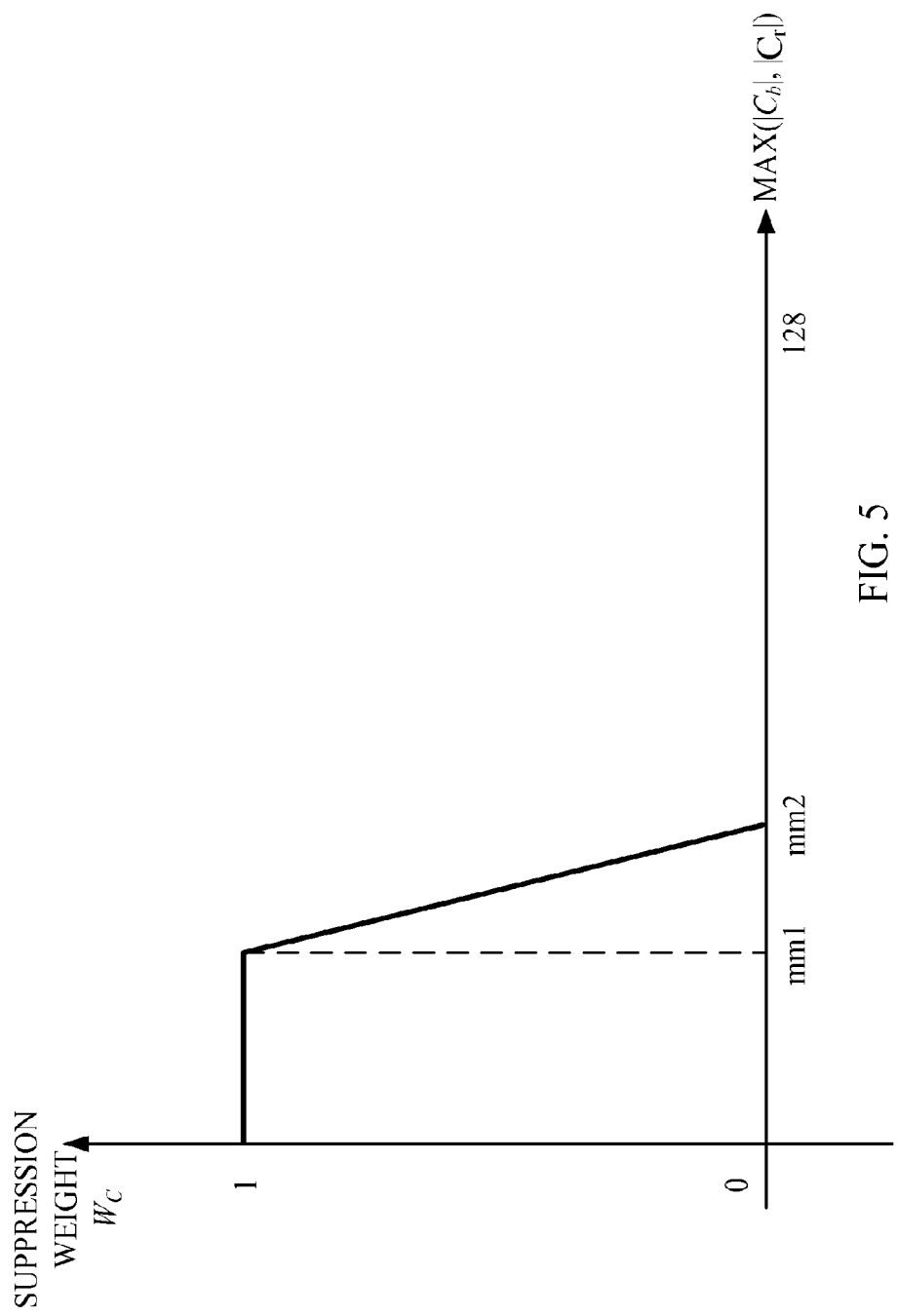
FIG. 5 is a graph illustrating the suppression weight variable in the illustrated embodiment.

The suppression weight mechanism 50 may include a lookup table, populated in accordance with the graph representing weight values in relation to a max chrominance value max (|Cb|, |Cr|) as shown in FIG. 5.

Figure 4:
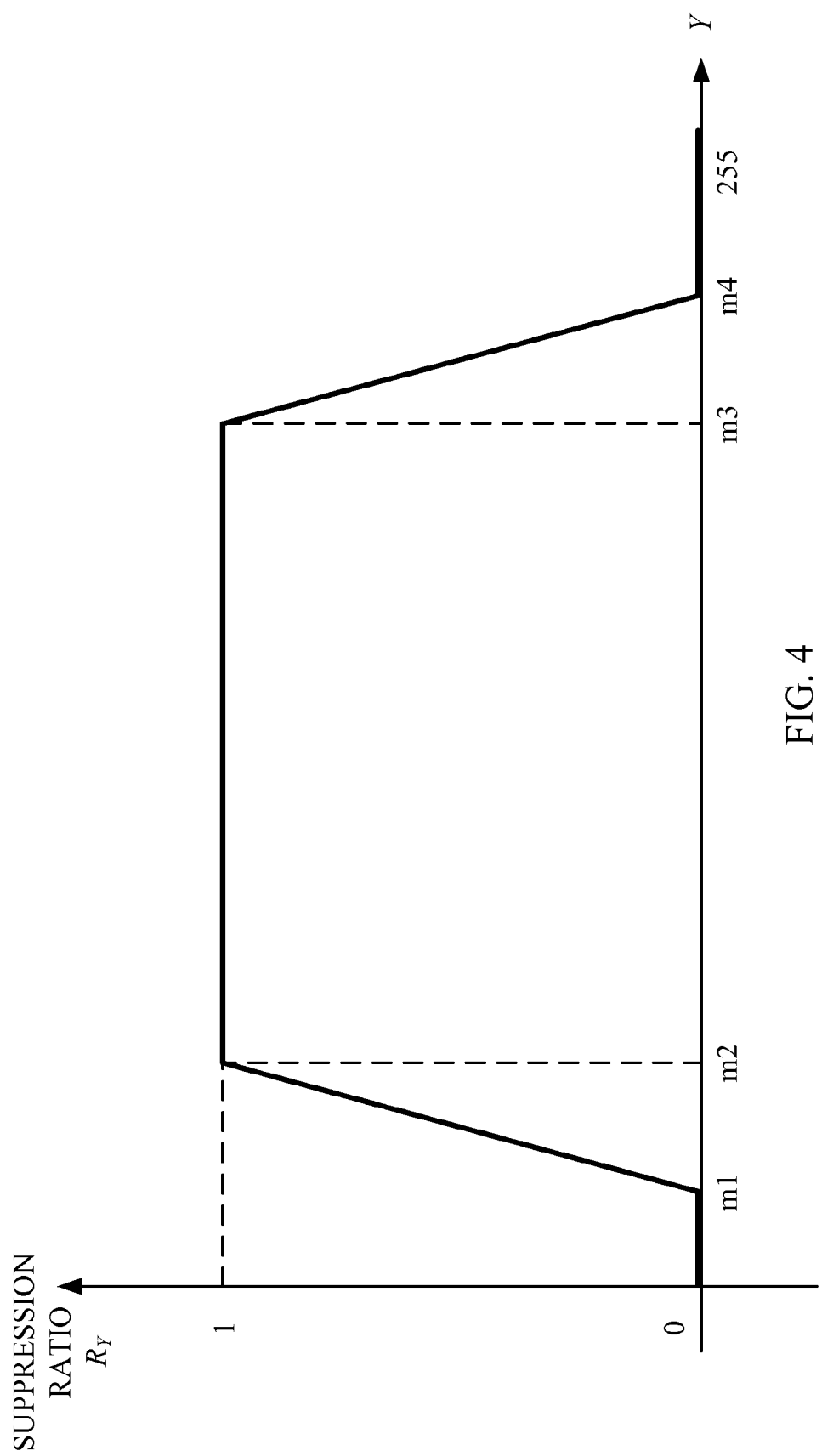
FIG. 4 is a graph illustrating the suppression ratio in the illustrated embodiment.

As shown in FIG. 4, the initial suppression ratio $R_Y$, as determined by suppression ratio mechanism 46, will generally be equal to one, when the region of the image being processed is neither substantially white nor substantially dark, i.e., when the luminance value Y is between m2 and m3. As the luminance goes below the lower threshold m2 and approaches the value m1, the suppression ratio gradually goes from one down to zero, e.g., in a linear fashion as shown in the graph of FIG. 4. As the luminance value goes beyond the higher threshold value m3 and approaches a value m4, the suppression ratio again goes from one down to zero. When the luminance value is below m1 or above m4, the suppression ratio is zero.

In determining the suppression weight based upon the chrominance values, a calculation is made by mechanism 48 of the maximum of the absolute values of Cb and Cr. Suppression weight mechanism 50 then compares this maximum value to the graph as shown in FIG. 5, which may be done with the use of a lookup table. When the max value is between zero and mm1, the suppression weight is equal to one. As the max value goes from mm1 to mm2, the suppression weight is lowered from one to zero in a linear fashion. Beyond mm2, the suppression weight is zero.

In some images there are bright colors (for example, a yellow flower), that should not be suppressed. Those colors generally have high chroma values. This weighting function helps preserve such information for certain colors, such as yellow.

The formula representing the overall suppression ratio, which is determined by overall suppression ratio mechanism 52, is as follows:

$$R_{OVERALL} = R_Y * W_C + 1 - W_C,$$

Where $R_{OVERALL}$ is the overall suppression ratio, $R_Y$ is the initial suppression ratio and $W_C$ is the suppression weight. Other variations are also contemplated. For example, the chrominance information may be modified or suppressed, as appropriate, using a different approach than that of the illustrated example embodiment. In the event one or both of the waveforms shown in FIGS. 4 and 5 is/are used, such waveform(s) may have a different shape. For example, one or more of the transitions from 1 to zero may be curved rather than linear.

While the specific embodiment illustrated above, for example, as shown in FIGS. 2-5, is applied to an image signal in the format of YCbCr, modifications are possible to accommodate different representations of luminance and chrominance information when other schemes are used, for example, RGB, CMY, CMYK, and so on, as noted above.

Each element described hereinabove may be implemented with a hardware processor together with computer memory executing software, or with specialized hardware for carrying out the same functionality. One or more components, for example, the image processing pipeline, or the portion of the image processing pipeline as shown in FIG. 1, may be in the form of an integrated circuit. Any data handled in such processing or created as a result of such processing can be stored, for example, in any memory available to the artisan. By way of example, such data may be stored in a temporary memory, such as a random access memory. In addition, or in the alternative, such data may be stored in longer-term storage devices, for example, magnetic disks, rewritable optical disks, and so on. For purposes of the disclosure herein, machine-readable media may comprise any form of media including computer-readable media, data storage mechanisms and specific hardware circuit representations of structures and of data.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees, and others.

What is claimed is:

1. An apparatus for modifying the color of an image region based on a luminance of the region, comprising:
   an image signal carrier, the image signal carrier being encoded with an image signal including luminance information and chrominance information of an image, the chrominance information including chrominance values;
   a luminance information evaluator to evaluate a luminance for a region within the image to identify when the luminance is less than a lower threshold value and identifies when the luminance is greater than a higher threshold value; and
   a chrominance information modifier to modify the chrominance information corresponding to the given region by multiplying the chrominance information by an overall suppression ratio, the overall suppression ratio based on a suppression ratio and a suppression weight, the suppression ratio selected based on luminance information in the image signal, and the suppression weight selected based only on the maximum of the chrominance values in the region, wherein a suppression of chrominance information resulting from the modification is lower when the luminance is between the lower threshold and the upper threshold relative to the suppression of chrominance information when the luminance is lower than the lower threshold value or higher than the higher threshold value.

2. The apparatus according to claim 1, wherein the image signal carrier includes one of a parallel and a serial interface.

3. The apparatus according to claim 1, wherein the image signal carrier includes a video pipeline.

4. The apparatus according to claim 1, wherein the image signal carrier includes a memory.

5. The apparatus according to claim 1, wherein the image signal is one of a Lab, RGB, CMY, CMYK, YUV, YCbCr, and YIQ type of image signal.

6. The apparatus according to claim 1, wherein the chrominance information modifier includes a suppression ratio multiplier to multiply a suppression ratio by individual values making up the chrominance information.

7. The apparatus according to claim 6, wherein the suppression ratio is equal to 1 when the given region is neither substantially white nor substantially dark.

8. The apparatus according to claim 1, further comprising at least one lookup table to evaluate the luminance information and to modify the chrominance information.

9. The apparatus according to claim 8, wherein the lookup table includes mechanism to output a suppression ratio value based on an input luminance value.

10. The apparatus according to claim 7, further comprising a weighting mechanism to weight the suppression ratio based on an amount of chrominance.

11. The apparatus according to claim 6, wherein the suppression ratio is based upon an evaluation of a level of a luminance value.

12. The apparatus according to claim 11, wherein the suppression ratio is further weighted based upon absolute values of the chrominance values.

13. The apparatus according to claim 1, wherein the luminance information is Y of a YCbCr signal, and wherein the chrominance information is Cb and Cr of the YCbCr signal.

14. A method of modifying the color of an image region based on a luminance of the region, comprising:
   carrying an image signal including luminance information and chrominance information of an image, the chrominance information including chrominance values;
   evaluating the luminance information in the image signal for a given region within the image to identify when a luminance value of the image region is less than a lower threshold value and to identify when the luminance value is greater than a higher threshold value; and
   modifying the chrominance information corresponding to the given region based on a suppression ratio determined from the luminance information and a suppression weight determined only from the maximum of the chrominance values in the region, wherein a suppression of chrominance information resulting from the modification is lower when the luminance value is between the lower threshold and the upper threshold relative to the suppression of chrominance information when the luminance value is lower than the lower threshold value or higher than the higher threshold value,
   said modifying performed under control of at least one electronic device.

15. The method according to claim 14, wherein the image signal is carried by one of a parallel and a serial interface.

16. The method according to claim 14 wherein the image signal is carried using a video pipeline.

17. The method according to claim 14, wherein the image signal is carried in a memory.

18. The method according to claim 14, wherein the image signal is one of a Lab, RGB, CMY, CMYK, YUV, YCbCr, and YIQ type of image signal.

19. The method according to claim 14, wherein the modification includes multiplying a suppression ratio by individual values making up the chrominance information.

20. The method according to claim 19, wherein the suppression ratio is equal to 1 when the given region is neither substantially white nor substantially dark.

21. The method according to claim 14, further comprising providing at least one lookup table to evaluate the luminance information and to modify the chrominance information.

22. The method according to claim 21, wherein the lookup table includes a mechanism to output a suppression ratio value based on an input luminance value.

23. The method according to claim 20, further comprising weighting the suppression ratio based on an amount of chrominance.

24. The method according to claim 19, wherein the suppression ratio is based upon an evaluation of a level of a luminance value.

25. The method according to claim 24, wherein the suppression ratio is further weighted based upon absolute values of the chrominance values.

26. The method according to claim 14, wherein the luminance information is Y of a YCbCr signal, and wherein the chrominance information is Cb and Cr of a YCbCr image signal.

27. An apparatus for modifying the color of an image region based on a luminance of the region, comprising:
   means for encoding a carrier with an image signal including luminance information and chrominance information of an image, the chrominance information including chrominance values;

means for evaluating the luminance information in the image signal for a region within the image to identify when a luminance value of the image region is less than a lower threshold value, and to identify when the luminance value is greater than a higher threshold value; and means for modifying the chrominance information corresponding to the given region by multiplying the chrominance information by an overall suppression ratio, the overall suppression ratio based on a suppression ratio and a suppression weight, the suppression ratio selected based on luminance information in the image signal, and the suppression weight selected based only on the maximum of the chrominance values in the region, wherein a suppression of chrominance information resulting from the modification is lower when the luminance value is between the lower threshold and the upper threshold relative to the suppression of chrominance information when the luminance value is lower than the lower threshold value or higher than the higher threshold value.

28. The apparatus according to 27, wherein the means for modifying include means for multiplying a suppression ratio by individual values making up the chrominance information.

29. An integrated circuit for modifying the color of an image region based on a luminance of the region comprising:
a semiconductor substrate carrying:
an image signal carrier, the image signal carrier being encoded with an image signal including luminance information and chrominance information of an image, the chrominance information including chrominance values;
a luminance information evaluator to evaluate the luminance information in the image signal for a region within the image to identify when a luminance value of the image region is less than a lower threshold value and to identify when the luminance value is greater than a higher threshold value; and
a chrominance information modifier to modify the chrominance information corresponding to the given region by multiplying the chrominance information by an overall suppression ratio, the overall suppression ratio based on a suppression ratio and a suppression weight, the suppression ratio selected based on luminance information in the image signal, and the suppression weight selected based only on the maximum of the chrominance values in the region, wherein a suppression of chrominance information resulting from the modification is lower when the luminance value is between the lower threshold and the upper threshold relative to the suppression of chrominance information when the luminance value is lower than the lower threshold value or higher than the higher threshold value.

30. The integrated circuit according to claim 29, wherein the chrominance information modifier includes a suppression ratio multiplier to multiply a suppression ratio by individual values making up the chrominance information.

31. A non-transitory machine-readable media encoded with data, the data being encoded to cause execution of a method of modifying the color of an image region based on a luminance of the region, the method comprising:
carrying an image signal including luminance information and chrominance information of an image, the chrominance information including chrominance values;
evaluating the luminance information in the image signal for a given region within the image to identify when a luminance value of the image region is less than a lower threshold value and to identify when the luminance value is greater than a higher threshold value; and
modifying the chrominance information corresponding to the given region by multiplying the chrominance information by an overall suppression ratio, the overall suppression ratio based on a suppression ratio and a suppression weight, the suppression ratio selected based on luminance information in the image signal, and the suppression weight selected based only on the maximum of the chrominance values in the region, wherein a suppression of chrominance information resulting from the modification is lower when the luminance value is between the lower threshold and the upper threshold relative to the suppression of chrominance information when the luminance value is lower than the lower threshold value or higher than the higher threshold value.

32. The non-transitory machine-readable media according to claim 31, wherein the data is encoded to further cause the modification including a suppression ratio multiplication multiplying a suppression ratio by individual values making up the chrominance information.

33. The method of claim 1, wherein the overall suppression ratio is equal to the suppression ratio * suppression weight+ 1−suppression weight.

* * * * *